March 29, 1932.  D. F. INMAN  1,851,843
ROD COUPLER
Filed Dec. 4, 1928
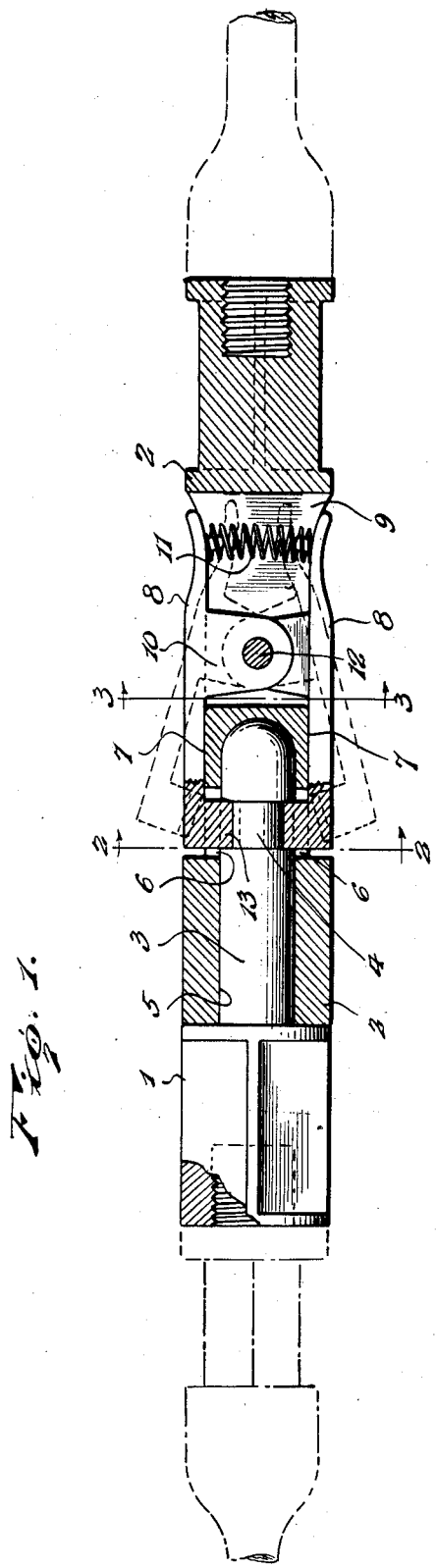
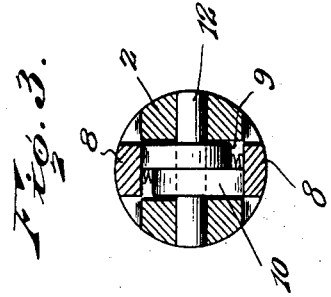
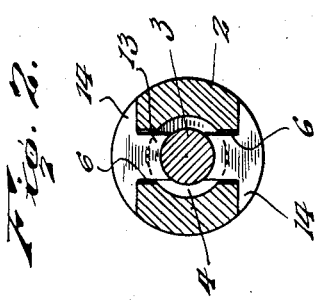
Inventor
D. F. Inman.
By Lacy & Lacy
Attorneys Patented Mar. 29, 1932

1,851,843

UNITED STATES PATENT OFFICE

DEE F. INMAN, OF STROUD, OKLAHOMA

ROD COUPLER

Application filed December 4, 1928. Serial No. 323,620.

This invention relates to means for readily connecting the sections of a sucker rod, or similar part, in a manner to admit of the sections being easily, quickly and conveniently separated and coupled as required.

The invention contemplates a coupler embodying similar parts, each of the parts being connected to a section of the rod, and one of the parts having an axially projecting stem, and the other part being formed with an axial opening to receive the said stem and provided with spring actuated latch members to automatically engage the said stem and hold the parts when coupled.

While the drawings illustate a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawings hereto attached, in which:—

Figure 1 is a central, longitudinal sectional view of a rod coupler embodying the invention, the dotted lines showing the parts to be connected and the position of the latch members to admit of ready separation of the coupler.

Figure 2 is a transverse section on the line 2—2 of Figure 1.

Figure 3 is a section similar to Figure 2 on the line 3—3 of Figure 1.

Corresponding and like parts are referred to in the following description and designated in the several views of the drawings by like reference characters.

The coupler comprises complemental members 1 and 2, each being formed in its outer end with a threaded opening to receive the threaded end of a section of the rod or like part to be detachably connected. The sections to be coupled are indicated by dotted lines in Figure 1. The member or part 1 is formed with an axial stem 3 in which is formed an annular groove or channel 4 adjacent its outer end which is made rounded. The member or part 2 has an axial opening 5 formed in its outer end to receive the stem 3. Lateral openings 6 are formed in opposite sides of the member 2 and connect with the axial opening 5. Longitudinal grooves or channels 7 extend from the lateral openings 6 and accommodate latch members 8 which are pivoted intermediate their ends to the member 2. A transverse slot 9 is formed in the member 2 a short distance from the axial opening 5 to accommodate lugs 10 and an expansible spring 11. The lugs 10 project inwardly from the latch members 8 and overlap and receive a pin 12 which pivotally connects the latch members to one another and to the member or part 2 of the coupler.

Each of the latch members 8 is formed at its outer end with a jaw 13 to pass through a lateral opening 6 and engage the annular groove 4 of the stem 3. Extensions 14 project laterally from opposite sides of the jaws 13 and overlap portions of the part 2 bordering upon the openings 6, thereby limiting the inward movement of the jaws. The outer sides of the extensions 14 and jaws 13 conform to the circumference of the member 2, as indicated most clearly in Figure 2 of the drawings.

The parts 1 and 2 are threaded or otherwise connected to the sections of the rod or other part to be coupled and these sections may be readily coupled by slipping the stem 3 into the axial opening 5, the rounded end of the stem pressing the jaws 13 outwardly and when the annular groove 4 registers with the jaws the latter enter the groove by a snap action and thus hold the parts against accidental separation. The coupling is connected automatically. To disconnect the parts the ends of the latch members 8 remote from the jaws 13 are pressed inwardly which causes the ends provided with the jaws to move outwardly, as indicated by the dotted lines in Figure 1. The stem 3 being released admits of the parts being readily separated by drawing the members 1 and 2 apart, as will be readily understood.

Having thus described the invention, I claim:—

A rod coupler comprising a member having a stem extending axially thereof from one end and formed with an annular groove spaced from its free end, a companion member including a body provided with an axially extending socket to receive the said stem having its inner end closed, the body having opposed lateral openings leading from said socket and a transverse slot spaced rearwardly from the socket and lateral openings, grooves being formed in opposite side portions of the body and having their ends opening into the slots and lateral openings, latch members seated in the longitudinal grooves and formed at their outer ends with jaws passing through the lateral openings to seat in the annular groove of the said stem, said latches having inwardly disposed lugs intermediate their ends extending into the slot in overlapping relation to each other, a pin passed through the ears and slot to pivotally mount the latches, and a spring within the transverse slot between the rear ends of the latch members yieldably holding the latches in an operative position.

In testimony whereof I affix my signature.

DEE F. INMAN. [L. S.]